(12) United States Patent
Byrnes

(10) Patent No.: US 7,065,573 B2
(45) Date of Patent: Jun. 20, 2006

(54) AUTOMATIC TRAFFIC AND QUALITY OF SERVICE CONTROL SYSTEM FOR COMMUNICATIONS NETWORKS

(75) Inventor: Philippe C. Byrnes, 877 Aspen Way, Palo Alto, CA (US) 94303

(73) Assignee: Philippe C. Byrnes, Albuqerque, NM (US)

(*) Notice: Subject to any disclaimer, the term of this patent is extended or adjusted under 35 U.S.C. 154(b) by 718 days.

(21) Appl. No.: 09/997,332

(22) Filed: Nov. 29, 2001

(65) Prior Publication Data

US 2002/0095493 A1 Jul. 18, 2002

Related U.S. Application Data

(60) Provisional application No. 60/251,325, filed on Dec. 5, 2000.

(51) Int. Cl.
*G06F 15/173* (2006.01)

(52) U.S. Cl. ............... 709/224; 370/229; 370/355; 370/356

(58) Field of Classification Search ........ 709/223–225, 709/238–239; 370/229–238.1, 255–256
See application file for complete search history.

(56) References Cited

U.S. PATENT DOCUMENTS

| | | | | |
|---|---|---|---|---|
| 5,265,092 | A | * 11/1993 | Soloway et al. | ............ 370/238 |
| 5,381,404 | A | 1/1995 | Sugano et al. | |
| 5,615,254 | A | 3/1997 | Qui et al. | |
| 5,914,936 | A | * 6/1999 | Hatono et al. | ............ 370/230 |
| 6,006,264 | A | * 12/1999 | Colby et al. | ............ 709/226 |
| 6,216,212 | B1 | * 4/2001 | Challenger et al. | ......... 711/163 |
| 6,725,264 | B1 | * 4/2004 | Christy | ........................ 709/225 |
| 6,871,233 | B1 | * 3/2005 | Bearden et al. | ............ 709/226 |

* cited by examiner

*Primary Examiner*—David Wiley
*Assistant Examiner*—Duyen Doan
(74) *Attorney, Agent, or Firm*—Dorsey & Whitney LLP (57) ABSTRACT

The present invention is directed to a system for controlling the quality of service and availability in a communications network. The system includes a processor which samples queue state information from selected intermediate nodes in the network and processes the queue state information to produce a traffic intensity map. The processor includes memory for storing said traffic intensity throughout the network as a traffic intensity surface and is configured to use the traffic intensity surface to control traffic in the network.

60 Claims, 5 Drawing Sheets

FIG_1

FIG_2

FIG_3

FIG_4

FIG_5

AUTOMATIC TRAFFIC AND QUALITY OF SERVICE CONTROL SYSTEM FOR COMMUNICATIONS NETWORKS

RELATED APPLICATIONS

This application claims priority to Provisional Application Ser. No. 60/251,325 filed Dec. 5, 2000.

BRIEF DESCRIPTION OF THE INVENTION

This invention relates generally to the automatic monitoring and control of performance and quality of service variables including response time, throughput, and utilization as well as availability variables including reliability and maintainability in distributed parameter discrete event systems such as communication networks and more particularly to the modeling of traffic intensity and describing its temporal-spatial dynamics.

BACKGROUND OF THE INVENTION

A computer communications network is a composite discrete event system (DES) made up of two classes of servers: links, which effect the actual transportation of data between source and destination end nodes; and intermediate nodes, which relay data between links, thereby effecting the concatenation of links to provide end-to-end transport of data. Other terms of art for an intermediate node include intermediate system and relay. This concatenation, which is generally referred to as routing or forwarding, may be static or dynamic. Static routing relies on pre-computed routing or forwarding tables that do not change even if there are changes in the state of the network's available links or intermediate nodes. Dynamic routing, in contrast, alters the routing or forwarding tables as feedback is received about changes in the state or topology of the network, possibly including information on the maximum available bandwidth or service rate of the network's links. When a network has been designed with redundant links, a principal advantage of dynamic routing is that it allows recovery from faults that might otherwise disable end-to-end transport of data.

The operation of dynamic routing is typically based on the exchange of routing tables and/or topology state-information among the intermediate nodes. The mechanism used to exchange this information is generally called a routing protocol. A routing protocol enables each intermediate node to construct a topology model, either implicit or explicit, of the network. When the routing protocol exchanges routing tables the topology model is implicit. With topology state routing, on the other hand, each intermediate node constructs, using the topology state information received from other intermediate nodes via the routing protocol, an explicit model of the current topology of the network. With either approach, it is through this exchange of feedback that each intermediate node synchronizes its topology state model, implicit or explicit, with its peers, i.e., the other intermediate nodes. The synchronization attempts to prevent concatenation faults such as forwarding loops by ensuring that each intermediate node has the same topology model.

Using its topology model, each intermediate node then calculates, typically using some form of dynamic programming optimization, the shortest paths to all the other intermediate nodes. The result of this calculation is a shortest path first (SPF) spanning tree from which each intermediate node derives its forwarding or routing table. Because each intermediate node's topology model is the same as its peers, the shortest path first (SPF) spanning trees, and hence the respective forwarding tables thus calculated, are consistent. A consequence, however, of employing spanning tree algorithms is that generally, in a network where the number of intermediate nodes is N and the number of links is L, only N−1 out of the L links are used to carry traffic. Any other links in the network are idled, and used only in the event that one of the N−1 links selected to carry traffic suffers a fault that causes the SPF spanning tree to be recalculated. A direct consequence of the use of a spanning tree to determine the forwarding or routing tables is that highly robust networks, with many redundant links, are necessarily highly inefficient; and that highly efficient networks, with few if any unused links, are necessarily fragile and subject to interruption of service by faults.

By design, topology-adaptive routing protocols only maintain connectivity, leaving routing tables unchanged unless there is a fault or other change that affects the bandwidth or service rate of a component intermediate node or link. In particular, topology-adaptive routing protocols will continue routing traffic through congested, heavily loaded parts of the network, even if idle links are available, so long as the bandwidth of the links in the SPF spanning tree remain unchanged. In fact, topology adaptive routing protocols that rely on implicit or explicit spanning trees of necessity create bottlenecks. This may be acceptable as long as computer networks transport only time-insensitive traffic such as bulk file transfers, email or most web-pages. However, computer networks are increasingly carrying large amounts of time sensitive traffic such as voice or video, both of which require highly consistent and predictable service from the network. Widely varying delays or latencies (also known as jitter) militate against the transportation over packet-switched networks of multimedia and other jitter-intolerant traffic.

The challenge of controlling performance variables such as response time, jitter, and throughput—generally referred to collectively as Quality of Service (QoS)—is that knowledge of topology alone is inadequate. As is well-known from queueing theory, bandwidth or service rate is just one of several variables that determine the performance of a discrete event system (DES), i.e., queueing system. Other variables include the traffic arrival rate(s), the storage available for queued traffic, and the scheduling discipline(s) used to determine the sequencing for execution of incoming requests for service, i.e., the forwarding of packets. Topology-adaptive routing protocols deliberately ignore these other variables when calculating the forwarding tables to be used by the intermediate nodes in a computer network. The forwarding tables that are calculated as part of the routing process are optimized with respect to topology and/or bandwidth but no attempt is made to include traffic state information or similar data about congestion in the network.

Part of the reason why routing protocols in use today do not include traffic or queueing state information is because of the negative experiences that occurred with several early routing protocols that attempted to do so by enhancing the state information exchanged by intermediate nodes with traffic-related data, most notably the ARPANET's Gateway to Gateway Protocol (GGP). The GGP used as the optimality metric in its routing process the estimated delay as measured by the queue length on outgoing links, which each intermediate node included in its routing updates. But the inclusion of such traffic state information in the routing caused major difficulties with instabilities due to rapidly changing state information generated by volatile queue dynamics. The result was large oscillations in routing as attempts to route traffic away from regions of congestion toward less utilized links suffered from overshoot, resulting in traffic bouncing between regions of the network as each region alternatively went from idle to congested and back again. Because of this phenomenon, subsequent routing protocols have avoided using dynamic traffic or queueing state information in their routing.

Another of the disadvantages of the prior art traffic-enhanced routing protocol approach has been the very substantial amounts of the network's total bandwidth consumed by the routing protocol's state updates, the frequency of which is determined by the volatility of the state information they are carrying. The frequency of topology changes (due to links and/or intermediate nodes suffering faults) is many orders of magnitude less than the frequency with which a link's queue changes size. Exacerbating this is the fact that, as is well-known from estimation theory, to adequately represent the dynamics of a varying signal requires sampling at twice the rate of the highest frequency component. Because queue sizes change with each arrival and/or each departure, the frequency of change can be arbitrarily high. Adequate sampling rates to capture the queueing dynamics generate vastly larger amounts of routing protocol update traffic than purely topology-adaptive routing protocols.

Because of these disadvantages, attempts to generate traffic-adaptive paths are today largely limited to manual efforts, where human operators or network engineers estimate traffic patterns and lay out routes that will avoid congested regions. It is widely recognized that this approach is neither accurate nor scalable: large networks will require tens of thousands of paths active at any given time, and generating these is simply beyond the capabilities of current or future network staffing.

Accordingly, a need exists for a method and system for automatically, without manual effort, controlling quality of service parameters including response time, jitter, throughput, and utilization and which is independent of topology. A further need exists for a method and system which meets the above need and which automatically, without manual effort, generates paths that minimize delay by avoiding congestion to the greatest extent possible without incurring unstable routing dynamics, especially large oscillations in routing. A further need exists for a method and system which meets the above need which is independent of the mix of traffic and protocols used in the computer communications network. A further need exists for a method and system which meets the above need without requiring modification of the hardware and software in the intermediate nodes in computer networks. A further need exists for a method and system which meets the above need without requiring proprietary protocols. A further need exists for a method and system which meets the above need without consuming excessive amounts of the network's bandwidth. A further need exists for a method and system which meets the above need without excessive computation and is therefore tractable to real-time, on-line optimization. A further need exists for a method and system which meets the above need and which utilizes a large percentage of the links in the network. A further need exists for a method and system which meets the above need and which can be used by content-caching applications to determine the optimal locations for content-caches to which web or similar requests can be redirected. A further need exists for a method and system which meets the above need and which can be used to provide input on traffic and utilization patterns and trends to capacity planning tools. A further need exists for a method and system which meets the above need and which can be used to identify links and/or intermediate nodes of a computer communications network that at certain times have either a deficit or surplus of bandwidth to a bandwidth trading tool which will either buy additional bandwidth or make available the surplus capacity for resale to carry third party traffic.

OBJECTS AND SUMMARY OF THE INVENTION

It is a general object of the present invention to provide a method and system for automatically controlling quality of service variables including response time, jitter, throughput, and utilization and availability variables including reliability and maintainability that overcomes the aforementioned short comings of the prior art.

It is another object of the present invention to actuate quality of service variables by automatically generating paths that route traffic around congestion and regions of high utilization in transport and in particular computer communication networks.

It is another object of the present invention to actuate quality of service variables by automatically generating paths that route traffic over a large percentage available links in transport and in particular computer communication networks.

It is a further object of the present invention to actuate quality of service variables by automatically determining the optimal locations at which cached replicated data may be located to avoid congested regions of a computer network, and to specify the optimal times when requests should be redirected to given locations.

It is a further object of the present invention to actuate quality of service variables by enabling the realization of self-tuning computer networks through the provision of traffic intensity and utilization state information to capacity planning tools that seek to adjust traffic and bandwidth.

It is a further object of the present invention to actuate quality of service variables by determining when certain links and/or intermediate nodes of a computer communications network have a deficit or surplus of bandwidth and to make this information available to a bandwidth trading tool which will either buy additional bandwidth or make the surplus bandwidth available for resale to carry third party traffic.

The foregoing and other objects of the invention are achieved by modeling the spatial traffic intensity distribution in a computer network and its spatial dynamics and temporal behavior. This is achieved by providing a population or traffic intensity map, similar to weather maps, for the discrete event system composed of the computer communications network and its traffic load. The plot of such a map over time describes the temporal and spatial dynamics of the discrete event system composed of the computer communications network and its traffic load. This provides information for controlling the quality of service variables. The control is achieved by a combination of (1) routing that minimizes transit through congested regions of the network, (2) by determining where content caches should be located in a computer communications network and when traffic should be directed to which cache location, (3) by determining when the network's topology and/or bandwidth should be changed to improve performance, and (4) by identifying local bandwidth surpluses or deficits as well as their persistence to enable bandwidth trading and/or network redesign.

BRIEF DESCRIPTION OF THE DRAWINGS

The foregoing and other objects of the present invention will be more clearly understood from the following description when read in conjunction with the accompanying drawings, of which.

DESCRIPTION OF PREFERRED EMBODIMENTS

A general description of the traffic intensity surface and maps and how they are constructed with the present invention can be illustrated by examining how weather maps are constructed. A weather map is a graphical depiction of the state of the atmosphere over a certain geographical region at a given time. To produce weather maps and weather predictions requires two systems: a monitoring system consisting of a number of instrumentation points where sensors are located to collect state information about the weather, including such variables as temperature, barometric pressure, etc.; and a meteorological modeling system that receives the state information thereby collected and which uses this information in conjunction with a mathematical model of the atmosphere's dynamics to predict the weather. The model, generally speaking, is implemented in the form of a software program that is stored on digital computer, although analogue computers can also be used in some circumstances to model the atmospheric dynamics. The weather model is then used to produce weather maps that interpolate between the instrumentation points and/or extrapolate forward into time to predict future weather dynamics and patterns.

Similarly, with the present invention an ATCC is a modeling system that constructs the traffic intensity surface and corresponding traffic intensity aka population density maps for a computer communications network. A major difference with weather modeling, however, is that the ATCC uses the state estimates derived from the traffic intensity model to determine how to best actuate changes in the quality of service of the discrete event system composed of the computer communications network and its traffic load. The ATCC, generally speaking, is a stored-program digital computer and the traffic intensity model it executes is a software program, although as with the meteorological modeling above analogue computers may be used in some circumstances to model the traffic intensity dynamics. The ATCC collects, generally via the same network for which it is managing traffic intensity and quality of service, queue state information from a sample or subset of the intermediate nodes in the computer network; the queue instrumentation will likely be present in most if not all intermediate nodes in the network.

The ATCC then uses this queue state information in conjunction with the mathematical model it is executing to construct the traffic intensity surface and traffic intensity maps to interpolate between the instrumentation points and/or extrapolate forward into time to predict future traffic intensity and QoS dynamics and patterns. The traffic intensity surface and traffic intensity maps are then fed as input to the ATCC's decision making as how to best control the spatial traffic dynamics using the actuation methods outlined below.

A further similarity exists between weather and traffic intensity modeling, namely the nature of the mathematical models used with each. A crucial characteristic of both transport networks, including computer communications networks, and weather is spatial variability: in the case of the former, one region of the network may be lightly utilized while another region is heavily utilized, while in the case of the latter one area may be receiving rain while another is not. So-called lumped-parameter models, in which the only independent variable is time and which rely on ordinary differential equations or their equivalents, are unable to represent such systems. Any mathematical model of traffic and/or utilization must therefore be in the form of a distributed parameter model described by partial differential equations or their equivalents. Modeling the quality of service dynamics as a spatial/temporal function rather than simply a temporal one just acknowledges one of the most obvious facts about real-world transport networks: congestion and performance are non-uniformly distributed, since one region of a network may be congested, with a local bandwidth deficit, while another region may be idle, with a local bandwidth surplus.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their meaning and intention to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "storing", "downloading", "prompting", "running" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical, mechanical, and analogue computers.

Figure 1:
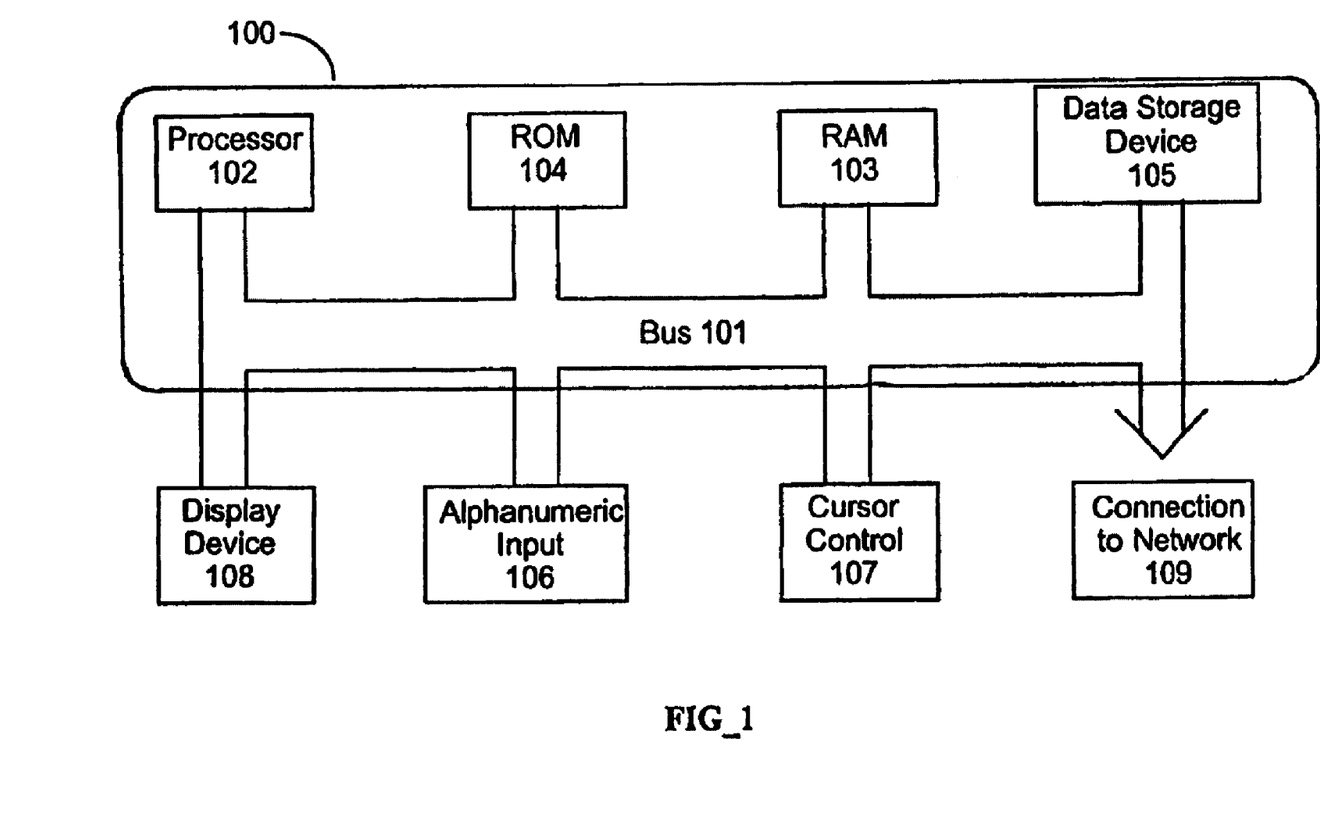
FIG. 1 shows a schematic diagram of an exemplary computer system used to perform steps of the present method in accordance with one embodiment of the present invention.

Portions of the present method and system are comprised of computer-readable and computer-executable instructions which reside, for example, in computer-usable media of a computer system. FIG. 1 illustrates an exemplary computer system 100 used to perform the present invention. It is appreciated that system 100 is exemplary only and that the present invention can operate within a number of different computer systems including general purpose networked computer systems, embedded computer systems, and stand alone computer systems. Furthermore, as will be described in detail, the components of computer 100 reside, for example, in an intermediate device (e.g., automatic traffic control computer) of the present system and method. Additionally, computer system 100 is well adapted having computer readable media such as, for example, a floppy disk, a compact disc, and the like coupled thereto. Such computer readable media are not shown coupled to computer system 100 for purposes of clarity.

System 100 includes an address/data bus 101 for communicating information, and a central processor unit 102 coupled to bus 101 for processing information and instructions. Central processor unit 102 may be an 80×86-family microprocessor or any other type of processor. Computer system 100 also includes data storage features such as a computer usable volatile RAM 103, e.g., random access memory (RAM), coupled to bus 101 for storing information and instructions for central processor unit 102, computer usable non-volatile memory 104, e.g., read only memory (ROM), coupled to bus 101 for storing static information and instructions for the central processor unit 102, and a data storage unit 105 (e.g., a magnetic or optical disk and disk drive) coupled to bus 101 for storing information and instructions. System 100 of the present invention also includes an optional alphanumeric input device 106, which includes alphanumeric and function keys, is coupled to bus 101 for communicating information and command selections to central processing unit 102. System 100 also includes an optional display device 108 coupled to bus 101 for displaying information. Additionally, computer system 100 includes feature 109 for connecting computer system 100 to a network, e.g., a local area network (LAN) or a wide area network (WAN).

Referring still to FIG. 1, optional display device 108 may be a liquid crystal device, cathode ray tube, or other display device suitable for creating graphic images and alphanumeric characters recognizable to a user. Optional cursor control device 107 allows the computer user to dynamically signal the two dimensional movement of a visible symbol (cursor) on a display screen of display device 108. Many implementations of cursor control device 107 are known in the art including a mouse, trackball, touch pad, joystick or special keys on alphanumeric input device 106 capable of signaling movement of a given direction or manner of displacement. Alternatively, it is appreciated that a cursor can be directed and/or activated via input from alphanumeric input device 106 using special keys and key sequence commands. The present invention is also well suited to directing a cursor by other means such as, for example, voice commands. A more detailed discussion of the method and system embodiments are found below.

Figure 2:
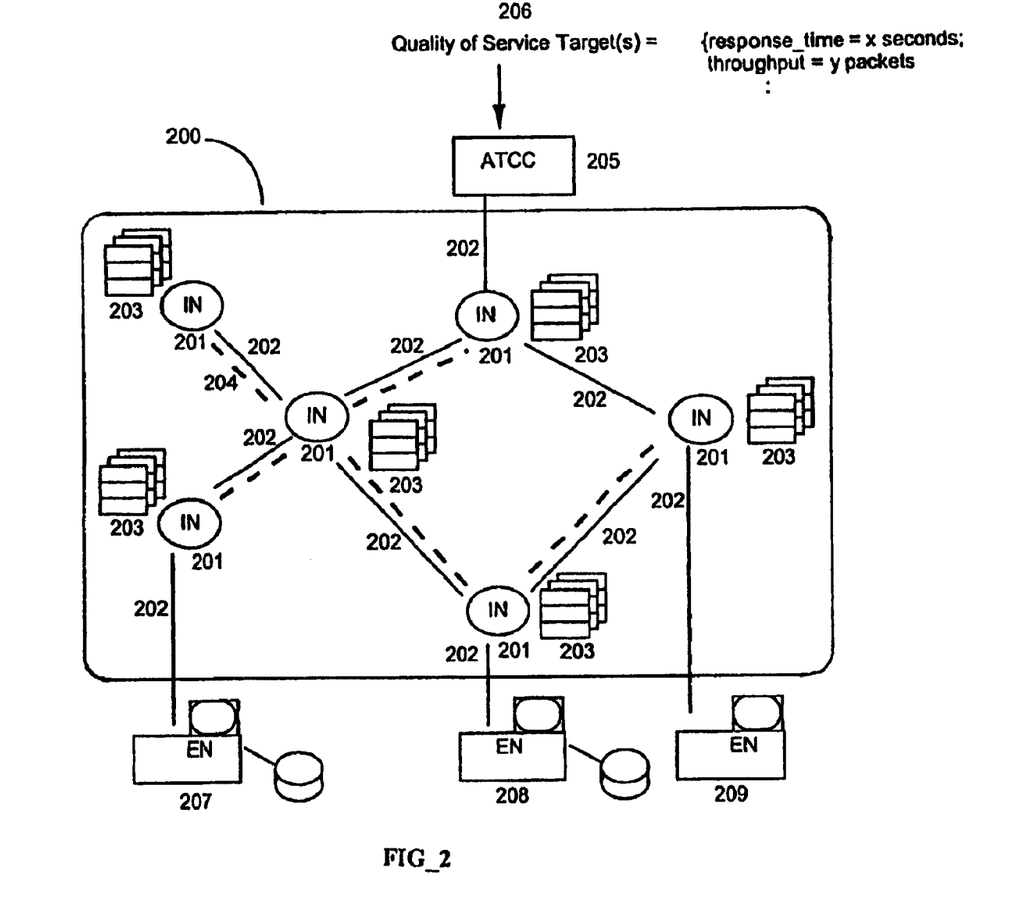
FIG. 2 shows a schematic representation of a system for monitoring and controlling the quality of service of a computer communication network consisting of links, intermediate nodes, and queues in the intermediate nodes, along with a device designated the Automatic Traffic Control Computer (ATCC), a device designated the content cache, a device designated the content cache manager, and a device designated the bandwidth manager.

FIG. 2 is a schematic representation of a system for monitoring and controlling the quality of service of a network 200 where the number N of intermediate nodes 201 is six and the number L of links 202 is six; these are arranged in what is known as the "fish" topology. The intermediate nodes 201 may be MPLS label-switched routers (LSRs), ATM switches, layer 2 bridges, etc. Each intermediate node 201 (IN) has associated with it a set of queues 203. Also shown is a spanning tree 204 used to forward traffic between INs; the spanning tree is stored in memory of the INs 201. The network includes an Automatic Traffic Control Computer 205 (ATCC), that collects queue state information from the intermediate nodes in the communications network. The ATCC 205 may contain, for example, the features of computer system 100 described above in detail in conjunction with FIG. 1. The ATCC is connected via feature 109 to either a WAN or LAN link, which is connected either directly or indirectly to computer communications network 200.

Figure 4:
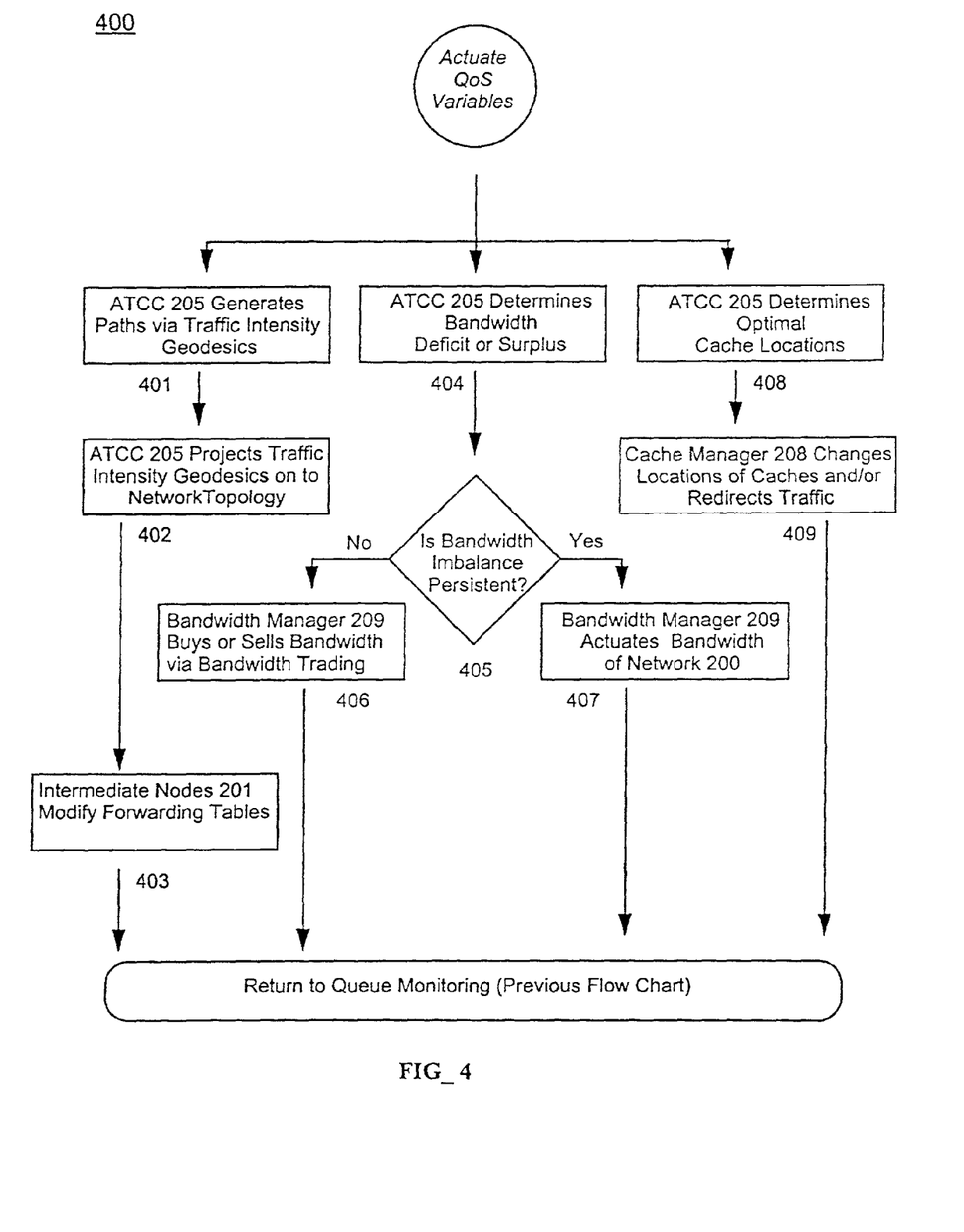
FIG. 4 is a flow chart indicating steps performed in accordance with one embodiment of the present invention to actuate the quality of service variables by applying the traffic intensity surface/population density function to the generation of paths, the location of content-caches, and the determination of local bandwidth deficits and/or surpluses for the purpose of bandwidth trading.

The ATCC 205 may receive quality of service targets 206 from a user such as a network operator using an input device 106. These targets are specified in terms of the response time, throughput, jitter, etc. The ATCC 205 attempts to attain these by actuating the network's traffic flows (following the steps outlined below in flowchart 400). For purposes of illustration only one ATCC 205 is depicted but nothing in this invention precludes a distributed implementation, where multiple ATCCs would have either disjoint or overlapping regions of the network that they each monitor and control with inter-ATCC coordination.

FIG. 2 also includes a content cache 207 and content cache manager 208 in two end nodes (ENs) attached via links 202 to INs 201. The content cache manager 208 is responsible for determining to which content cache 207 user requests for cached data will be sent. The bandwidth manager 209 attached via a link 202 to an IN 201 is responsible for actuating the bandwidth of the network 200, either by permanently adding or deleting bandwidth in the form of links 202 and/or INs 201 or by temporarily renting additional bandwidth from or to $3^{rd}$ party networks.

Figure 3:
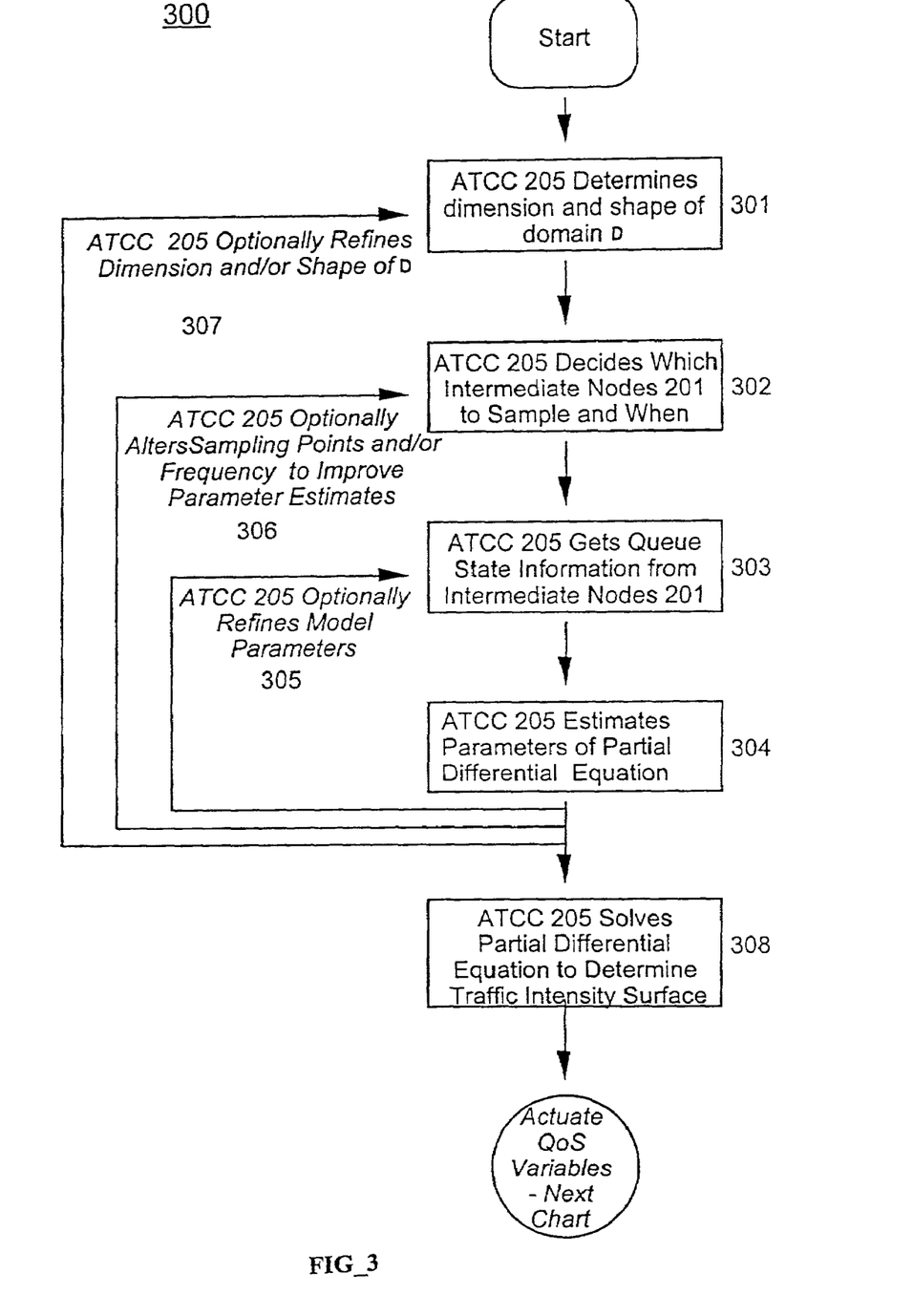
FIG. 3 is a flow chart indicating steps performed in accordance with one embodiment of the present invention to estimate the parameters of the partial differential equation that best models the traffic intensity of the computer network and its traffic load, to solve the partial differential equation, and to obtain the population density function and traffic intensity surface.

With reference now to the flowchart 300 of FIG. 3, the steps performed by the present invention to achieve quality of service is described. Flowchart 300 includes processes of the present invention which, in one embodiment, are carried out by a processor or processors under the control of computer readable and computer executable instructions. The computer readable and computer executable instructions reside, for example, in data storage features such as computer usable volatile memory 103 and/or computer usable non-volatile memory 104 of FIG. 1. The computer readable and computer executable instructions are used to control or operate in conjunction with, for example, central processing unit 102. Although specific steps are disclosed in flowchart 300 of FIG. 3, such steps are exemplary. That is, the present invention is well suited to performing various other steps or variations of the steps in FIG. 3.

In step 301 the shape and/or dimensions of the domain $\mathscr{D}$, which constitutes the area of definition and solution for the partial differential equation that will model the distributed parameter discrete event system, are determined to best fit the network and its traffic load. Step 301 may be executed by the ATCC 205 or by human operators. Once the shape and/or dimensions of the domain $\mathscr{D}$ have been determined, this information is stored in the memory of the ATCC 205.

In step 302 the ATCC 205 selects a set of random sample points (intermediate nodes) in the communications network that shall be sampled and determines how frequently the sampling will occur. As with other forms of sampling, the choice of the initial number and location of sample points should be random but is nonetheless subject to constraints of spatial and statistical representativeness; techniques for ensuring that random spatial sample points are representative include stratified sampling and multistage sampling. This invention does not depend on which technique is used. The exact number and location of spatial sample points necessary to adequately estimate the partial differential equation (PDE) parameters will vary depending on the nature of a given DES's dynamics—some traffic and/or network dynamics will necessitate more sample points, while other traffic and/or network dynamics will allow fewer.

In step 303 of FIG. 3 the ATCC 205 retrieves queue state information from the intermediate nodes (INs) that ATCC 205 decided to sample in step 302 and the queue state information is stored in memory. The communication between the ATCC 205 and the intermediate nodes 201 is effected either by connecting the ATCC 205 directly to the computer communications network for which it is controlling the quality of service or by having the ATCC 205 connect remotely over $3^{rd}$ party private network(s) or the Internet itself. In so doing, the ATCC 205 and the intermediate nodes 201 are able to communicate with each other.

The ATCC 205 may use a variety of protocols in the collection of queue state information in step 303. These include the Simple Network Management Protocol (SNMP) and the ISO Common Management Information Protocol (CMIP). Other alternatives to using SNMP, for example, include the TELNET protocol that most intermediate nodes implement to allow remote management by a distant operator.

But almost all intermediate nodes (routers, switches, etc.) implement SNMP and maintain state information in the form of standardized SNMP management information bases (MIBs). Many SNMP MIBs contain queue state information that can be retrieved by the ATCC 205. An example of an SNMP MIB that contains queue state information including measurements of the current size of outbound queues is the if (interfaces) group, which defines for every interface in an intermediate node a table, called the ifTable, that includes the MIB state variable called ifOutQLen, which maintains measurements of the number of packets in the output queue for the interface. Those intermediate nodes that do not maintain queue size counters obviously can not be monitored directly but indirect queue state information may nonetheless be inferred from other system state information such as measurements of free memory and allocated memory: by monitoring the ebb and flow of memory usage, it is possible to infer changes in queue sizes and other queue state information for the aggregate of all the interfaces in an intermediate node. In addition, the influence a given intermediate node on traffic intensity dynamics can be inferred from the neighboring nodes that do maintain queue state information. This invention does not depend on which type of queue state information is used.

The present invention does not require that queue state information be smoothed before being used to estimate the PDE parameters, using for example techniques such as autoregressive moving averages (ARMA), Kalman filtering, etc., to reduce noise in queue state information, but this may be optionally employed by the ATCC 205.

The ATCC 205 in step 304 estimates from the data sets thereby collected and stored in memory the parameters of the partial differential equation that best models the traffic intensity of the computer network and its traffic load. In most cases the PDE model will be the parabolic $2^{nd}$ order PDE known as the heat, diffusion or transport equation; but this invention encompasses using other types of PDEs when circumstances warrant, such as elliptic PDEs when the network and its traffic comprising the discrete event system are in steady state. The decision as to which type of PDE will be employed may be made by the user or by the ATCC 205. The model chosen is stored in memory by the ATCC 205.

For the purpose of this disclosure the focus in step 304 will be on the heat equation, one form of which is:

$$\frac{\partial u}{\partial t} + \frac{\partial (V_1(t,x,y,u)u)}{\partial x} + \frac{\partial (V_2(t,x,y,u)u)}{\partial y} = \frac{\partial}{\partial x}\left(D(t,x,y,u)\frac{\partial u}{\partial x}\right) + \frac{\partial}{\partial y}\left(D(t,x,y,u)\frac{\partial u}{\partial y}\right) + f(t,x,y,u)$$

where
u(x,y,t)=population density
f(x,y,t,u)=general sink/source terms such as lateral boundary flux (in mass density per unit time) and death/birth flux
D(t,x,y,u)=diffusion coefficient
$V_1(t,x,y,u)$, $V_2(t,x,y,u)$=advection coefficients The PDE parameters to be estimated in step 304 include the temporal and spatial dependence of the coefficients for the advective/convective velocity V and its components $V_1$ and $V_2$, the random diffusion D, the exogenous forcing function f of general sink/source terms such as lateral boundary and death/birth flux, initial conditions and other terms. Generally speaking, these will be functions of the spatial variables, time, and possibly the population density u itself.

This process of parameter estimation where the aim is to "fit" an equation to a set of empirical data is often called an inverse problem, also sometimes known as model building. A variety of methods can be employed in step 304 for solving the inverse problem, including but not limited to cubic splines, modal or quasimodal approximations, least-squares, operator factorization, nonlinear variation of constants, and Galerkin methods. This invention does not depend on which technique is used.

If the combination of traffic arrival and service rates is isotropic then there will be no spatial dependence in the coefficients. However, most if not all distributed parameter discrete event systems (networks and traffic loads) will exhibit anisotropy, that is spatial dependence of the various coefficients. The anisotropy is determined by the topology of the network and its pattern of interconnections, by the bandwidth of the links and intermediate nodes, and by the traffic arrival rates. In addition, most traffic patterns will not be static: they will exhibit temporal variations, i.e. vary over time. For example, most networks have at least two strong periodic components to their traffic loads: a 24 hour period corresponding to the work day and a 7 day period corresponding to the week. A secular or non-periodic trend will also be present in the traffic loads for most networks, with either decline or, as is more likely, growth in traffic as demand from end users increases and internally generated management traffic increases as well as the network grows.

In step 305 the ATCC 205 optionally repeats the task of retrieving queue state information (step 303) with the queue state information stored in memory by the ATCC 205. It is possible to estimate the PDE parameters and coefficients once and then leave them unchanged; more useful, however, is to periodically resample the queue state information at the intermediate nodes that have been chosen as sample points and to recursively or iteratively update the model. This process of continuous improvement is sometimes called calibrating or tuning the model. The model calibration can be made more efficient by using an estimate of queue volatility—for example, the standard deviation of the queue sizes—in each region of the network to adjust the sample frequency on a region by region basis so that those regions of the network that are exhibiting volatility (large standard deviations of queue sizes) can be sampled more frequently while those regions that are exhibiting stability (small standard deviations of queue sizes) can be sampled less often. This invention does not depend on which technique is used.

In step 306 the ATCC 205 optionally extends the task of calibrating or tuning the model to include modifying the number and/or location of the spatial sampling that was decided in step 302. The estimation process the ATCC 205 executes in step 304 may itself indicate that more or fewer sample points are needed to adequately estimate the PDE's parameters. Alternatively, the ATCC 205 may regularly or periodically execute step 302 to decide fresh where to sample the queue state information in the computer communications network.

In step 307 of FIG. 3 the ATCC 205, once it has estimated the PDE's parameters using one of the aforementioned techniques, optionally alters the shape and/or dimensions of the domain $\mathscr{D}$ to better fit the network and its traffic load. Such techniques as separation of variables, model-order reduction and conformal mapping may be used to significantly reduce the computational requirements of estimating the PDE's parameters.

Once the PDE's parameters have been estimated using one of the aforementioned techniques, the ATCC 205 in step 308 solves the PDE or one of its equivalents such as integral, functional and delay differential, and/or finite difference equations, to yield a population density function u that can be used to predict the quality of service in the network at any given location and time. A variety of methods can be employed in step 308 for solving the PDE or its equivalents, including perturbation methods, similarity methods, characteristic methods, transformations, numerical methods, and ad hoc methods. This invention does not depend on which technique is used. The population density function u is stored in memory by the ATCC 205.

The population density is an approximation to the queue population in the computer network: expansion and contraction of the individual queues may vary from that predicted by u but the approximation accurately tracks and predicts the overall ebb and flow of the traffic intensity in the discrete event system. The population density function u found in step 308 reflects traffic intensity or utilization $\rho(x,y,t)$ rather than traffic levels alone: from queueing theory it is well-known that the size of any given queue is determined by not just the traffic arrival rate(s) but by the service rate of the outbound link, the ratio of which is the traffic intensity $\rho$. Plotting the population density function u yields a surface, here designated the traffic intensity surface, where the height of the surface approximates the size the queues in the intermediate nodes in the network being modeled. Running time forward with the model allows the present method to predict the future state of the discrete event system. The traffic intensity surface is stored in memory by the ATCC 205. In addition, the traffic intensity surface may be presented for visual inspection using feature 108.

This population density/traffic intensity approach has the further advantage that it is independent of the actual bandwidth of the network's links and intermediate nodes: a region of low traffic but also with low bandwidth will have the same population density/traffic intensity value as a region of high bandwidth but with correspondingly higher traffic. Both such regions constitute performance bottlenecks that should be bypassed when actuating traffic to improve the quality of service variables for the discrete event system composed of the network and its traffic.

This population density/traffic intensity approach has the further advantage that it is independent of the actual protocols used in the network: the queued packets may be of any protocol or mix of protocols. The queues that are being measured can even be heterogeneous with respect to the level in the protocol stack: in one intermediate system the queue measurements can be of the number of layer 2 protocol data units (also known as frames) while in another intermediate system the queue measurements can be of the number of layer 3 protocol data units (also known as packets). The only requirement is consistency: the level in the protocol stack at which queue measurements are made can not be changed without recalibrating the PDE model starting with step 301.

An immediate consequence of the fact that protocol level is irrelevant to the measurement of queue sizes is that every type of intermediate node, including intermediate nodes that make layer 2 forwarding decisions, generally speaking called switches or bridges, as well as intermediate nodes that make layer 3 forwarding decisions, generally speaking called routers or layer 3 switches, can be monitored and controlled by the use of traffic intensity geodesics. A further advantage of using traffic intensity geodesics is that it reduces the need for fine-detail bandwidth state information to be collected and disseminated via the (topology-adaptive) routing protocol(s) used in the network. What is absolutely needed is the status (operative vs. inoperative) of the network's links and intermediate nodes.

The flowchart 400 FIG. 4 shows the steps performed in accordance with one embodiment of the present invention to actuate traffic and/or network topology and/or bandwidth to automatically control quality of service and availability variables. Three principal techniques for actuating traffic and/or network topology/bandwidth are included in flowchart 400. Flowchart 400 includes process of the present invention which, in one embodiment, are carried out by a process or processors under the control of computer readable and computer executable instructions. The computer readable and computer executable instructions reside, for example, in data storage features such as computer usable volatile memory 103 and/or computer usable non-volatile memory 104 of FIG. 1. The computer readable and computer executable instructions are used to control or operate in conjunction with, for example, central processing unit 102. Although specific steps are disclosed in flowchart 400 of FIG. 4, such steps are exemplary. That is, the present invention is well suited to performing various other steps or variations of the steps in FIG. 4.

All three actuation techniques in flowchart 400 start with the population density function u found by the ATCC 205 in step 308 of FIG. 3 and which was stored in memory of the ATCC 205. As a region of the network becomes more congested due to increased traffic flowing through it and/or a reduction in the network's bandwidth in that region, the height of the traffic intensity surface will increase in that region. Similarly, as a region of the network becomes less congested due to reduced traffic flowing through it and/or an increase in the network's bandwidth in that region, the height of the traffic intensity surface will decrease in that region.

In step 401 paths are created by the ATCC 205 to actuate the quality of service and availability variables of the traffic/network discrete event system. The ATCC 205 may create paths in response to a request from an intermediate node 201 for a new or modified route, or the request may come from a network operator using feature 106 or from an automated program running in memory of ATCC 205. A benefit to using a traffic intensity surface to approximate the population of queues in a network is that many powerful optimization techniques and methods can be applied to the task of finding optimal paths, most notably the techniques of differential geometry and the calculus of variations, including solving the Euler-Lagrange equation by dynamic programming, shooting methods, direct methods, numerical methods, etc. This invention does not depend on which technique is used. The ATCC 205 stores in memory the paths created in step 401.

Finding the shortest path between two points on a surface is a well-known problem in the calculus of variations, where such paths are called geodesics. The paths found in step 401 are referred to as traffic intensity geodesics since they are shortest paths found on the traffic intensity surface found by plotting the population density function u. A traffic intensity geodesic by definition is the least-congested path between two nodes connected by the communication network. The larger problem of finding the minimal surface is also solved by the techniques of the calculus of variations, where it is sometimes known as Plateau's problem.

In addition, the process of finding geodesics in step 401 can be extended to provide differentiated services (generally known as DiffServ) by the ATCC 205 selecting non-geodesic paths, that is paths that lack the optimality of geodesics, and/or by altering the cost functional used in the optimization. These suboptimal trajectories will result in lower quality of service and performance since they will not avoid as much of the congestion in the network. Users of the computer communications network can specify a QoS profile (in terms of response time, throughput, utilization, etc.) they desire and for which level of quality they are willing to pay.

In step 402 the paths found as traffic intensity geodesics in step 401 are projected by the ATCC 205 on to a map of the actual links of the computer communications network 200, the topology of which may have been obtained from the topology-adaptive routing protocol used in network 200, from human operators, or other sources such as network management applications. The topology of network 200 is stored in memory by the ATCC 205. A variety of techniques can be employed in step 402 for projecting the traffic intensity geodesics on to the actual links of the computer communications network, including least-squares minimization, linear programming, etc. Whichever technique is used, in step 402 the ATCC 205 finds the network links "closest" to the traffic intensity geodesics. The ordered sequence of these links constitutes a route and is stored in memory by the ATCC 205.

The routes created by the ATCC 205 may differ significantly from the shortest-paths found by the prior art topology-adaptive routing protocols precisely because the latter ignore performance and quality of service factors in their optimization of routes. Routing traffic through a lightly loaded region of the network will result in improved performance, even if the path chosen is longer than an alternate path that nonetheless passes through a heavily congested region.

Once the paths have been mapped or projected on to the actual links and intermediate nodes of the network in step 402, there are numerous mechanisms that can be used by the ATCC 205 to set-up the forwarding tables in the intermediate nodes 201 in the network 200. For example, when the communication network 200 employs MultiProtocol Label Switching (MPLS) and the intermediate nodes 201 are label-switched routers (LSRs) then ATCC 205 can download forwarding table changes by sending the ReSerVation Protocol (RSVP) messages to establish and/or modify label-switched paths (LSPs). When the communication network 200 employs Asynchronous Transfer Mode (ATM) then the ATCC 205 can download forwarding table changes by sending Signaling System 7 (SS7) or Network to Network Interface (NNI) messages to establish and/or modify ATM virtual paths and virtual channels. Even in standard IP networks the source-route option can be used to direct traffic along the traffic geodesic. In each of the above examples the ATCC 205 uses the computer communications network 200 to send route information to intermediate nodes 201 so that they can alter their respective forwarding tables. In step 403 the intermediate nodes 201 modify their forwarding tables to actuate the traffic intensity.

In step 404 the traffic intensity surface is used to determine if any imbalances of traffic load and network bandwidth exist in the discrete event system and if so where and when these occur. A given network can simultaneously have some regions in balance while other regions are unbalanced, with simultaneous bandwidth deficits and surpluses to be expected. An imbalance is simple to detect from the traffic intensity surface: where queue sizes are above some threshold there exists a bandwidth deficit while where queue sizes are below some threshold there exists a bandwidth surplus. In step 404 these thresholds are determined from the quality of service target values that the ATCC 205 uses as its target(s) for controlling the discrete event system's quality of service and performance.

In step 405 the ATCC 205 determines whether a given imbalance is persistent or not. If the imbalance is not persistent then the optimal actuation of quality of service variables is to either buy or sell temporary bandwidth on the "spot" to actuate the imbalance(s). If the imbalance is persistent the optimal actuation of quality of service variables is to either buy or sell permanent bandwidth.

This is effected by the ATCC 205 in step 406. The ATCC 205's determination of whether an imbalance is persistent and what level of persistence qualifies will depend on the "rent vs. buy" cost tradeoff: it is less expensive to "rent" temporary bandwidth if the bandwidth deficit does not last for long whereas if the bandwidth deficit lasts longer then the optimal actuation is to actuate the bandwidth and/or topology of the computer communications network in step 407. The ATCC 205 uses the traffic intensity surface, found in step 308 and stored in memory, and the past "history" of the traffic intensity surface similarly stored in memory, to determine the persistence of the imbalance for each region of the computer communications network 200. This information is sent to the bandwidth manager 209. The ATCC 205 may display the imbalances graphically using feature 108.

In step 408 the ATCC 205 uses the traffic intensity surface to determine the optimal locations of content caches 207. This is similar to steps 406 and 407 with respect to determining which regions, if any, of the network have a surplus or deficit of bandwidth. Content caching involves replicating frequently requested content such as web pages and placing copies of the content at multiple locations in the computer communications network. Requests for cached content from either end users or internal to the network 200 are redirected by the caching system's manager 208 to the cache that is nearest to the end user.

In step 409 the ATCC 205 determines the locations of the content caches and/or the times when each cache should be active, thereby actuating the traffic load in the network. The ATCC 205 effects the changes to the content caches 207 by sending this information via communication network 200 to the cache-content manager 208 responsible for the actuation of cache locations and for redirection of content requests to the optimal content cache 207. If a content cache 207 that is active, meaning end user requests are directed to it by the cache redirection mechanisms, in a region of the computer communications network that is congested, meaning it suffers from a bandwidth deficit, then by moving the content cache and/or redirecting content requests to replicated caches 207 located in regions of the network that are not congested the result is to have actuated the quality of service variables since traffic will be redirected away from the congested region(s) of the network and toward regions that have more idle transport bandwidth.

Figure 5:
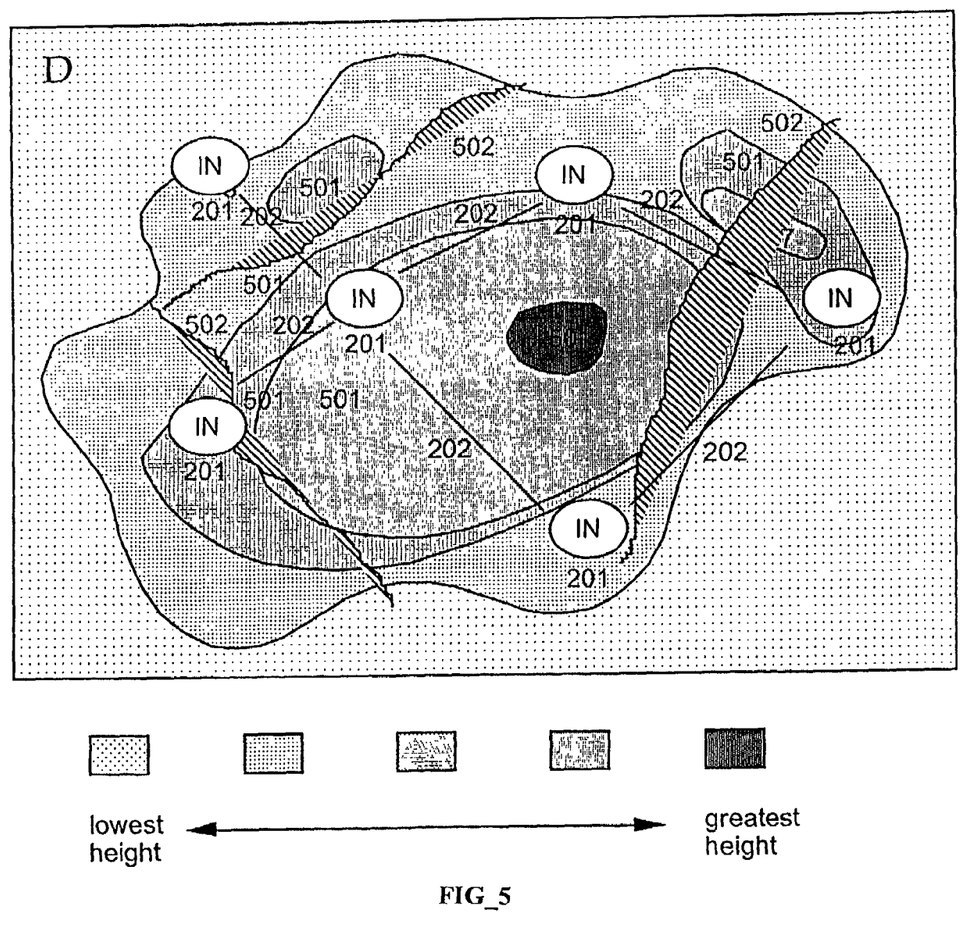
FIG. 5 is a depiction of a traffic intensity surface with traffic intensity isoclines indicating various levels of population density, as well as traffic intensity geodesics.

In FIG. 5 the network depicted in FIG. 2 is shown along with one possible traffic intensity surface. The height of the traffic intensity surface at various points is indicated using isoclines 501 to show the depth or size of the queues in that region of the network. The darker the shading, the higher the traffic intensity surface is at that point. It is important to emphasize that this is a "snapshot" which would evolve over time as the traffic and/or bandwidth and/or topology of the computer communications network change. In addition, three traffic geodesics 502 are shown for the discrete event system composed of the network and its traffic load. The height under a geodesic 502 at a given location represents the estimated queue size there.

What is claimed is:

1. A system for monitoring and controlling quality of service and availability of a discrete event system composed of a computer communications network having intermediate nodes, said system comprising: an intermediate device, said intermediate device including memory for storing a traffic intensity surface therein, said intermediate device adapted to monitor traffic intensity by modeling the traffic intensity as a partial differential equation, said intermediate device sampling queue state information in intermediate nodes in said network and from this queue state information estimating the parameters of the partial differential equation model and solving the partial differential equation to produce the traffic intensity surface; said intermediate device configured to control traffic intensity by using several actuation mechanisms that include creating routes that minimize transit through congested regions of said network and downloading said routes to intermediate nodes for use in updating their forwarding tables, that include determining optimal times and locations for content caches to operate in said network and downloading said times and locations to cache content managers in said network, that include determining whether to correct bandwidth imbalances in said network either by buying and selling of short term bandwidth or by actuation of said network's topology and resources, including links and intermediate node capacities, and downloading said bandwidth actuations to bandwidth managers in the computer communications network; and a set of traffic actuation devices, said devices including intermediate nodes responsible for relaying traffic between links in the computer communications network, including cache content managers responsible for deciding where to locate content caches in the computer communications network and when to have each content cache active, including bandwidth managers responsible for adding or deleting bandwidth in the computer communications network either temporarily or permanently.

2. A system as described in claim 1 wherein said intermediate device is a computer system.

3. A system as described in claim 1 wherein said intermediate device is an automatic traffic and quality of service control computer.

4. A system as described in claim 1 wherein said intermediate device collects queue state information from intermediate nodes in the computer communications network that is being managed.

5. A system as described in claim 1 wherein said intermediate device estimates the parameters of the partial differential equation that describes the traffic intensity dynamics of the discrete event system.

6. A system as described in claim 1 wherein said intermediate device solves the partial differential equation that describes the traffic intensity dynamics of the computer communication network to yield the traffic intensity surface for the discrete event system.

7. A system as described in claim 6 wherein said intermediate device generates optimal and suboptimal paths that are geodesics and non-geodesics, respectively, of the traffic intensity surface.

8. A system as described in claim 7 wherein said intermediate device generates optimal and suboptimal routes by projecting the optimal and suboptimal paths on to the topology of the computer communications network.

9. A system as described in claim 8 wherein said intermediate device actuates the traffic intensity by sending the optimal routes to intermediate nodes for the purpose of updating their forwarding tables.

10. A system as described in claim 1 wherein said intermediate device determines the optimal times and locations for content caches to operate.

11. A system as described in claim 10 wherein said intermediate device actuates the traffic intensity by downloading the optimal times and locations for content caches to operate to cache content managers in the computer communications network.

12. A system as described in claim 1 wherein said intermediate device determines the times and locations of bandwidth imbalances in the computer communications network and their persistence.

13. A system as described in claim 12 wherein said intermediate device actuates the traffic intensity by downloading the times and locations of the bandwidth imbalances to a bandwidth manager in the computer communications network.

14. An intermediate device for monitoring and controlling quality of service and availability of a discrete event system composed of a computer communications network having intermediate nodes, said intermediate device comprising memory for storing a traffic intensity surface therein, said intermediate device adapted to monitor traffic intensity by modeling the traffic intensity as a partial differential equation, said intermediate device sampling queue state information in intermediate nodes in said network and from this queue state information estimating the parameters of the partial differential equation model and solving the partial differential equation to produce the traffic intensity surface; said intermediate device adapted to control traffic intensity by using several actuation mechanisms that include creating routes that minimize transit through congested regions of said network and downloading said routes to intermediate nodes for use in updating their forwarding tables, that include determining optimal times and locations for content caches to operate in said network and downloading said times and locations to cache content managers in said network, that include determining whether to correct bandwidth imbalances in said network either by buying and selling of short term bandwidth or by actuation of said network's topology and resources, including links and intermediate node capacities, and downloading said bandwidth actuations to bandwidth managers in the computer communications network.

15. A system as described in claim 14 wherein said intermediate device is a computer system.

16. A system as described in claim 14 wherein said intermediate device is an automatic traffic and quality of service control computer.

17. A system as described in claim 14 wherein said monitoring and controlling causes the quality of service and availability variables for the discrete event system to improve.

18. A method for monitoring and controlling the quality of service and availability variables for a discrete event system composed of a computer communications network and its traffic load, said method comprising the steps of:
  (a) collecting queue state information from intermediate nodes in the computer communications network that is being managed and storing these in memory of an intermediate device;
  (b) estimating the parameters of the partial differential equation that describes the traffic intensity dynamic of the discrete event system and storing these in memory of an intermediate device;
  (c) solving the partial differential equation that describes the traffic intensity dynamic of the computer communication network to yield the traffic intensity surface for the discrete event system and storing this in memory of an intermediate device;
  (d) generating optimal and suboptimal paths that are geodesics and non-geodesics, respectively, of the traffic intensity surface and storing these in memory of an intermediate device;
  (e) generating optimal and suboptimal routes by projecting the optimal and suboptimal paths on to the topology of the computer communications network and storing these in memory of an intermediate device;
  (f) actuating the traffic intensity by downloading the optimal routes to intermediate nodes for the purpose of updating their forwarding tables; and/or
  (g) determining the optimal times and locations for content caches to operate and storing these in memory of an intermediate device
  (h) actuating the traffic intensity by downloading the optimal times and locations for content caches to operate to cache content managers in the computer communications network; and
  (i) determining the times and locations of bandwidth imbalances in the computer communications network and their persistence and storing these in memory of an intermediate device; and
  (j) actuating the traffic intensity by downloading the time and locations of the bandwidth imbalances to a bandwidth manager in the computer communication network.

19. A method as described in claim 18 wherein step (a) comprises collecting said queue state information and storing them in memory of a computer system.

20. A method as described in claim 18 wherein step (a) comprises collecting said queue state information and storing them in memory of an automatic traffic and quality of service control computer.

21. A method as described in claim 18 wherein step (b) comprises estimating the parameters of the partial differential equation that describes the traffic intensity dynamics of the discrete event system and storing them in memory of a computer system.

22. A method as described in claim 18 wherein step (b) comprises estimating the parameters of the partial differential equation that describes the traffic intensity dynamics of the discrete event system and storing them in memory of an automatic traffic and quality of service control computer.

23. A method as described in claim 18 wherein step (c) comprises solving the partial differential equation that describes the traffic intensity dynamics of the computer communication network to yield the traffic intensity surface for the discrete event system and storing this in memory of a computer system.

24. A method as described in claim 18 wherein step (c) comprises solving the partial differential equation that describes the traffic intensity dynamics of the computer communication network to yield the traffic intensity surface for the discrete event system and storing this in memory of an automatic traffic and quality of service control computer.

25. A method as described in claim 18 wherein step (d) comprises generating optimal and suboptimal paths that are geodesics and non-geodesics, respectively, of the traffic intensity surface and storing these in memory of a computer system.

26. A method as described in claim 18 wherein step (d) comprises generating optimal and suboptimal paths that are geodesics and non-geodesics, respectively, of the traffic intensity surface and storing these in memory of an automatic traffic and quality of service control computer.

27. A method as described in claim 18 wherein step (e) comprises generating optimal and suboptimal routes by projecting the optimal and suboptimal paths on to the topology of the computer communications network and storing these in memory of a computer system.

28. A method as described in claim 18 wherein step (e) comprises generating optimal and suboptimal routes by projecting the optimal and suboptimal paths on to the topology of the computer communications network and storing these in memory of an automatic traffic and quality of service control computer.

29. A method as described in claim 18 wherein step (f) comprises actuating the traffic intensity by downloading the optimal routes to intermediate nodes for the purpose of updating their forwarding tables, wherein said updating of their forwarding tables causes the intermediate nodes to improve the computer communications network's quality of service and availability by routing traffic around congestion and regions of high utilization in the computer communication network.

30. A method as described in claim 18 wherein step (f) comprises actuating the traffic intensity by downloading the optimal routes to intermediate nodes for the purpose of updating their forwarding tables, wherein said updating of their forwarding tables causes the intermediate nodes to improve the computer communications network's quality of service and availability by routing traffic over a large percentage of available links in the computer communication network.

31. A method as described in claim 18 wherein step (g) comprises determining the optimal times and locations for content caches to operate and storing these in memory of a computer system.

32. A method as described in claim 18 wherein step (g) comprises determining the optimal times and locations for content caches to operate and storing these in memory of an automatic traffic and quality of service control computer.

33. A method as described in claim 18 wherein step (h) comprises actuating the traffic intensity by downloading the optimal times and locations for content caches to operate to cache content managers in the computer communications network, wherein said optimal cache times and locations causes the cache content managers to improve the computer communications network's quality of service and availability by avoiding congested regions of the computer communications network, and to specify the optimal times when requests should be redirected to given cache locations.

34. A method as described in claim 18 wherein step (i) comprises determining the times and locations of bandwidth imbalances in the computer communications network and their persistence and storing these in memory of a computer system.

35. A method as described in claim 18 wherein step (i) comprises determining the times and locations of bandwidth imbalances in the computer communications network and their persistence and storing these in memory of an automatic traffic and quality of service control computer.

36. A method as described in claim 18 wherein step (j) comprises actuating the traffic intensity by downloading the times and locations of the bandwidth imbalances to bandwidth managers in the computer communications network, wherein said times and locations cause the bandwidth managers to improve the computer communications network's quality of service and availability by correcting bandwidth imbalances in the computer communications network either by buying and selling of short term bandwidth or by actuation of said network's topology and resources, including links and/or intermediate node capacities.

37. In a computer system having a processor coupled to a bus, a computer system coupled to said bus and having stored therein a computer program that when executed by said processor causes said computer system to implement a method for managing quality of service and availability in a computer communications network, said method comprising the steps of:

(a) collecting queue state information from intermediate nodes in the computer communications network that is being managed and storing these in memory of an intermediate device;

(b) estimating the parameters of the partial differential equation that describes the traffic intensity dynamics of the discrete event system and storing these in memory of an intermediate device;

(c) solving the partial differential equation that describes the traffic intensity dynamics of the computer communication network to yield the traffic intensity surface for the discrete event system and storing this in memory of an intermediate device;

(d) generating optimal and suboptimal paths that are geodesics and non-geodesics, respectively, of the traffic intensity surface and storing these in memory of an intermediate device;

(e) generating optimal and suboptimal routes by projecting the optimal and suboptimal paths on to the topology of the computer communications network and storing these in memory of an intermediate device;

(f) actuating the traffic intensity by downloading the optimal routes to intermediate nodes for the purpose of updating their forwarding tables; and (g) determining the optimal times and locations for content caches to operate and storing these in memory of an intermediate device (h) actuating the traffic intensity by downloading the optimal times and locations for content caches to operate to cache content managers in the computer communications network; and (i) determining the times and locations of bandwidth imbalances in the computer communications network and their persistence and storing these in memory of an intermediate device; and (j) actuating the traffic intensity by downloading the bandwidth imbalances to a bandwidth manager in the computer communications network.

38. A computer system as described above in claim 37 wherein step (a) of said computer implemented method stored on said computer system comprises collecting said queue state information and storing it in memory of a computer system.

39. A system medium as described above in claim 37 wherein step (a) of said computer implemented method stored on said computer system comprises collecting said queue state information and storing it in memory of an automatic traffic and quality of service control computer.

40. A computer system as described above in claim 37 wherein step (b) of said computer implemented method stored on said computer system comprises estimating the parameters of the partial differential equation that describes the traffic intensity dynamics of the discrete event system and storing these in memory of a computer system.

41. A computer system as described above in claim 37 wherein step (b) of said computer implemented method stored on said computer system comprises estimating the parameters of the partial differential equation that describes the traffic intensity dynamics of the discrete event system and storing these in memory of an automatic traffic and quality of service control computer.

42. A computer system as described above in claim 37 wherein step (c) of said computer implemented method stored on said computer system comprises solving the partial differential equation that describes the traffic intensity dynamics of the computer communication network to yield the traffic intensity surface for the discrete event system and storing this in memory of a computer system.

43. A computer system as described above in claim 37 wherein step (c) of said computer implemented method stored on said computer system comprises solving the partial differential equation that describes the traffic intensity dynamics of the computer communication network to yield the traffic intensity surface for the discrete event system and storing this in memory of an automatic traffic and quality of service control computer.

44. A computer system as described above in claim 37 wherein step (d) of said computer implemented method stored on said computer system comprises generating optimal and suboptimal paths that are geodesics and non-geodesics, respectively, of the traffic intensity surface and storing these in memory of a computer system.

45. A computer system as described above in claim 37 wherein step (d) of said computer implemented method stored on said computer system comprises generating optimal and suboptimal paths that are geodesics and non-geodesics, respectively, of the traffic intensity surface and storing these in memory of an automatic traffic and quality of service control computer.

46. A computer system as described above in claim 37 wherein step (e) of said computer implemented method stored on said computer system comprises generating optimal and suboptimal routes by projecting the optimal and suboptimal paths on to the topology of the computer communications network and storing these in memory of a computer system.

47. A computer system as described above in claim 37 wherein step (e) of said computer implemented method stored on said computer system comprises generating optimal and suboptimal routes by projecting the optimal and suboptimal paths on to the topology of the computer communications network and storing these in memory of an automatic traffic and quality of service control computer.

48. A computer system as described above in claim 37 wherein step (f) of said computer implemented method stored on said computer system comprises actuating the traffic intensity by downloading the optimal routes to intermediate nodes for the purpose of updating their forwarding tables, wherein said updating of their forwarding tables causes the intermediate nodes to improve the computer communications network's quality of service and availability by routing traffic around congestion and regions of high utilization in the computer communication network.

49. A computer system as described above in claim 37 wherein step (g) of said computer implemented method stored on said computer system comprises determining the optimal times and locations for content caches to operate and storing these in memory of a computer system.

50. A computer system as described above in claim 37 wherein step (g) of said computer implemented method stored on said computer system comprises determining the optimal times and locations for content caches to operate and storing these in memory of an automatic traffic and quality of service control computer.

51. A computer system as described above in claim 37 wherein step (h) of said computer implemented method stored on said computer system comprises actuating the traffic intensity by downloading the optimal times and locations for content caches to operate to cache content managers in the computer communications network, wherein said optimal cache times and locations cause the cache content managers to improve the computer communications network's quality of service and availability by avoiding congested regions of the computer communications network, and to specify the optimal times when requests should be redirected to given cache locations.

52. A computer system as described above in claim 37 wherein step (i) of said computer implemented method stored on said computer system comprises determining the times and locations of bandwidth imbalances in the computer communications network and their persistence and storing these in memory of a computer system.

53. A computer system as described above in claim 37 wherein step (i) of said computer implemented method stored on said computer system comprises determining the times and locations of bandwidth imbalances in the computer communications network and their persistence and storing these in memory of an automatic traffic and quality of service control computer.

54. A computer system as described above in claim 37 wherein step (j) of said computer implemented method stored on said computer system comprises actuating the traffic intensity by downloading the times and locations of the bandwidth imbalances to bandwidth managers in the computer communications network, wherein said times and locations cause the bandwidth managers to improve the computer communications network's quality of service and availability by correcting bandwidth imbalances in the computer communications network either by buying and selling of short term bandwidth or by actuation of said network's topology and resources, including links and/or intermediate node capacities.

55. A system for monitoring and controlling quality of service and availability in a communications comprising,
 a processor including memory for storing a traffic intensity surface,
 said processor configured to sample queue state information for selected intermediate nodes in said network to provide queue state information and processing said state information to produce said traffic intensity surface, and
 said processor being further configured to used said traffic intensity surface to control the traffic in the network.

56. A system as in claim 55 in which said traffic control includes generating paths that route traffic around congestion and regions of high utilization.

57. A system as in claim 55 in which the process is further configured to generate the optimal locations at which caches of replicated data may be located to avoid congested regions of the network and to specify the optimal times when requests should be redirected to given cache locations.

58. A system as in claim 55 in which said traffic control includes generating paths that route traffic over a larger percentage of available links.

59. A system as in claim 55 in which said processor is configured to provide traffic intensity and utilization state information to capacity planning tools that seek to adjust traffic and bandwidth.

60. A system as in claim 55 in which said processor is additionally configured to determine when certain links and/or intermediate nodes of the network have surplus bandwidth or a bandwidth deficit and the level of persistence of such bandwidth imbalances and when such imbalances should be actuated using either a bandwidth trading tool which will remedy or purchase bandwidth to actuate bandwidth deficits and/or make available surplus capacity for resale to third party traffic, or when such imbalances should be actuated by actuating the network's topology and/or bandwidth.

* * * * *